(12) United States Patent
Lamb

(10) Patent No.: US 11,638,413 B2
(45) Date of Patent: *May 2, 2023

(54) AUTOMATIC SELF-CLEANING, SELF-FILLING PET WATER BOWL APPARATUS, METHODS AND SYSTEMS

(71) Applicant: J & L INNOVATIONS LLC, Carlsbad, CA (US)

(72) Inventor: Aaron Paul Lamb, Boulder, CO (US)

(73) Assignee: J & L INNOVATIONS LLC, Carlsbad, CA (US)

( * ) Notice: Subject to any disclaimer, the term of this patent is extended or adjusted under 35 U.S.C. 154(b) by 151 days.

This patent is subject to a terminal disclaimer.

(21) Appl. No.: 17/086,937

(22) Filed: Nov. 2, 2020

(65) Prior Publication Data

US 2021/0112775 A1 Apr. 22, 2021

Related U.S. Application Data

(63) Continuation of application No. 16/391,033, filed on Apr. 22, 2019, now Pat. No. 10,820,572, which is a continuation of application No. 15/278,221, filed on Sep. 28, 2016, now Pat. No. 10,264,762, which is a continuation of application No. 14/511,109, filed on Oct. 9, 2014, now Pat. No. 9,456,582.

(60) Provisional application No. 61/892,845, filed on Oct. 18, 2013.

(51) Int. Cl.
*A01K 7/04* (2006.01)
*A01K 7/02* (2006.01)
*A01K 1/035* (2006.01)
*G06F 3/0488* (2022.01)

(52) U.S. Cl.
CPC .............. *A01K 7/04* (2013.01); *A01K 1/035* (2013.01); *A01K 7/02* (2013.01); *A01K 7/027* (2013.01); *G06F 3/0488* (2013.01)

(58) Field of Classification Search
CPC .......... A01K 7/02; A01K 7/027; A01K 7/022; A01K 7/025; A01K 7/06; A01K 7/00; A01K 7/04
See application file for complete search history.

(56) References Cited

U.S. PATENT DOCUMENTS

| | | | | |
|---|---|---|---|---|
| 5,433,171 A | * | 7/1995 | Ewell | A01K 7/02 119/51.5 |
| 5,813,363 A | * | 9/1998 | Snelling | A01K 7/027 119/73 |
| 7,762,211 B1 | * | 7/2010 | McDaniel | A01K 7/02 119/51.5 |
| 9,456,582 B2 | * | 10/2016 | Lamb | A01K 7/02 |
| 2010/0175625 A1 | * | 7/2010 | Klenotiz | A01K 7/06 119/74 |
| 2015/0107522 A1 | * | 4/2015 | Lamb | A01K 7/04 119/51.5 |
| 2015/0192933 A1 | * | 7/2015 | Hymes | A01K 7/02 137/386 |

(Continued)

*Primary Examiner* — Kristen C Hayes
(74) *Attorney, Agent, or Firm* — Tillman Wright, PLLC; Chad D. Tillman

(57) ABSTRACT

An automatic self-cleaning and self-filling outdoor fluid feeding system for an animal, including for example a pet, includes a sink; a fluid transport system; a housing supporting the sink and containing the fluid transport system; and a control assembly configured to control the automatic self-cleaning and self-filling operations of the system.

15 Claims, 12 Drawing Sheets

(56) References Cited

U.S. PATENT DOCUMENTS

2015/0373945 A1* 12/2015 Sung .................. A01K 5/02
119/51.02

* cited by examiner

AUTOMATIC SELF-CLEANING, SELF-FILLING PET WATER BOWL APPARATUS, METHODS AND SYSTEMS

CROSS-REFERENCE TO RELATED APPLICATIONS

The present application is a continuation of, and claims priority under 35 U.S.C. § 120 to, U.S. patent application Ser. No. 16/391,033 filed Apr. 22, 2019, which '033 application is a continuation of, and claims priority under 35 U.S.C. § 120 to, U.S. patent application Ser. No. 15/278,221 filed Sep. 28, 2016 and now U.S. Pat. No. 10,264,762, which '221 application is a continuation of, and claims priority under § 120 to, U.S. patent application Ser. No. 14/511,109 filed Oct. 9, 2014 and now U.S. Pat. No. 9,456,582, which '109 application is a nonprovisional of, and claims priority under 35 U.S.C. 119(e) to, U.S. provisional patent application 61/892,845 filed Oct. 18, 2013, which provisional patent application is incorporated by reference herein.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

COMPUTER PROGRAM LISTING

Submitted concurrently herewith via the USPTO's electronic filing system, and incorporated herein by reference, are computer program files including instructions, routines, and/or other contents. A table setting forth the name and size of the files included in the computer program listing is shown below.

| File Name | Creation Date | File Size (bytes) |
| --- | --- | --- |
| ASCIFY.TXT | 10/09/2014 19:04 | 37473 |
| ED.TXT | 10/09/2014 19:04 | 2436420 |
| README.TXT | 10/09/2014 19:04 | 2576 |

The "README.TXT" file contains instructions for using MASM version 6.11 to compile an assembly conversion program from source code that is contained in the "ASCIFY.TXT" file. The complied program then can be used to convert the "ED.TXT" file into a compressed .zip file. The compressed .zip file contains an eDrawings file viewable using a free eDrawings program downloadable over the Internet. The eDrawings file represents a computer model of an embodiment of the invention.

BACKGROUND OF THE INVENTION

The present invention generally relates to animal feeding systems and, in particular, to pet water bowl apparatus, methods and systems. Pet water bowl apparatus, methods, and systems are known. For example, U.S. Patent Application Publication No. 2005/0160995 purports to show an apparatus for supplying fresh water to pets on a constant basis. One or more embodiments in accordance with one or more aspects and features of the present invention are believed to represent improvements over conventional animal feeding systems and, in particular, pet water bowl apparatus, methods and systems.

SUMMARY OF THE INVENTION

The present invention includes many aspects and features. Moreover, while many aspects and features relate to, and are described in, the context of automatic, self-cleaning and self-filling water bowl apparatus, methods and systems for pets, the present invention is not limited to use only in such context, as will become apparent from the following summaries and detailed descriptions of aspects, features, and one or more embodiments of the present invention. For example, such apparatus, methods and systems are applicable in the context of animals other than pets, including animals in zoos as well as on farms and ranches, for example. Indeed, such apparatus, methods and systems can be used in the context of horses, for instance.

Accordingly, in an aspect of the present invention, an automatic, self-cleaning and self-filling water bowl apparatus a sink; a fluid transport system; a housing supporting the sink and containing the fluid transport system; and a control assembly configured to control the automatic self-cleaning and self-filling operations of the apparatus.

In a feature, the sink functions as a water bowl.

In a feature, the apparatus functions as a water feeding system for an animal.

In a feature, the apparatus functions as an outdoor water feeding system for a pet.

In a feature, the sink has a fluid holding capacity comparable to conventional water bowls for dogs.

In a feature, the fluid transport system comprises a fluid inflow subsystem for transporting water to the sink, and a fluid outflow subsystem for transporting fluid from the sink. In particular, the fluid inflow subsystem preferably transports water from an exterior of the housing to the sink, and the fluid outflow subsystem preferably transports water from the sink to an exterior of the housing.

In a feature, the control assembly comprises a controller; a proximity sensor; a water level detector; and a valve control mechanism. In features of this aspect, the fluid outflow system begins at an elevation below the bottom of the sink; ascends therealong to an elevation as high as the desired level of water to be held in the sink; and then descends therealong to an elevation at least to—and preferably below—the elevation of the bottom of the sink; the valve control mechanism comprises a solenoid valve that controls the flow of water through the fluid inflow subsystem to the sink; the control assembly further comprises a second valve control mechanism that controls the flow of water from the fluid inflow subsystem, through a bypass of the sink, to the fluid outflow subsystem; and the water level detector comprises a float switch for detecting when the water level in the sink reaches a predetermined level, wherein the water level detector is operatively connected to the controller, detection that the water level in the sink has reached the predetermined level triggers a signal to the controller; and the signal to the controller results in closing of the valve control mechanism.

In a feature, the apparatus further comprises a power supply that plugs into a conventional outlet for powering of the apparatus.

In a feature, the apparatus further comprises one or more batteries for powering of the apparatus.

In a feature, the control assembly is solar powered.

In a feature, the housing further supports a removable food bowl at an elevated position, which food bowl is received within an opening of the countertop of the housing.

In a feature, the control assembly further comprises a temperature sensor operatively connected to a controller of the control assembly and configured to detect the temperature of water in the sink, wherein the temperature can be monitored by the controller and wherein the controller is configured to initiate a flush and fill cycle upon the temperature reaching a predetermined threshold.

In a feature, the control assembly further comprises an display screen operatively connected to the controller for displaying information. The information displayed may comprise at least one of water temperature, number of flushes and fills, status of operations, and any combination thereof, which information preferably is monitored and stored in transitory or non-transitory computer-readable medium of the controller, as desired.

In a feature, the control assembly detects when an animal is proximate the housing in front of the sink and, when the animal leaves such proximity, the control assembly initiates a flush and fill cycle during which the sink is flushed and filled with fluid. In a feature, the cycle may be performed each time an animal is detected to have left such proximity; the cycle may be performed after a predetermined number of times that an animal has been detected to have left such proximity, such as for example three times; or both. Additionally, the predetermined number when included may be set by a user at the time of use of the apparatus; the display may include a touch screen display operatively connected to the controller, by which the predetermined number is set or adjusted by a user during use of the apparatus, when a display is included.

In another feature, an included valve control mechanism comprises a solenoid valve that controls the flow of fluid through, and a flush and fill cycle may be performed by opening the valve control mechanism to permit fluid flow therethrough. Additionally, the control assembly may further comprise a second valve control mechanism comprising a second solenoid valve. In this scenario, the first valve control mechanism controls fluid flow through the fluid inflow subsystem to the sink; and the second valve control mechanism controls fluid flow through the fluid inflow subsystem, around the sink thereby bypassing the sink, to the fluid outflow subsystem. The fluid transport system also may further comprise a sprayer configured such that, due to fluid pressure, fluid is sprayed onto at least a portion of the side wall of the sink thereby rinsing the side wall of sink during at least part of the flush and fill cycle.

In another feature, a flush and fill cycle is performed by performing an opening and closing sequence of a plurality of valve control mechanisms to selectively permit fluid flow therethrough for active flushing and draining of fluid from the sink and filling of the sink with fluid. The sequence may be based on overlapping or exclusive opening of the two or more of the valve control mechanisms as well as duration of time that each valve control mechanism remains open.

In another aspect, one or more systems include the aforementioned aspect and one or more features.

In another aspect, methods includes use and operation of the aforementioned apparatus and systems.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings.

DETAILED DESCRIPTION

Figure 1:
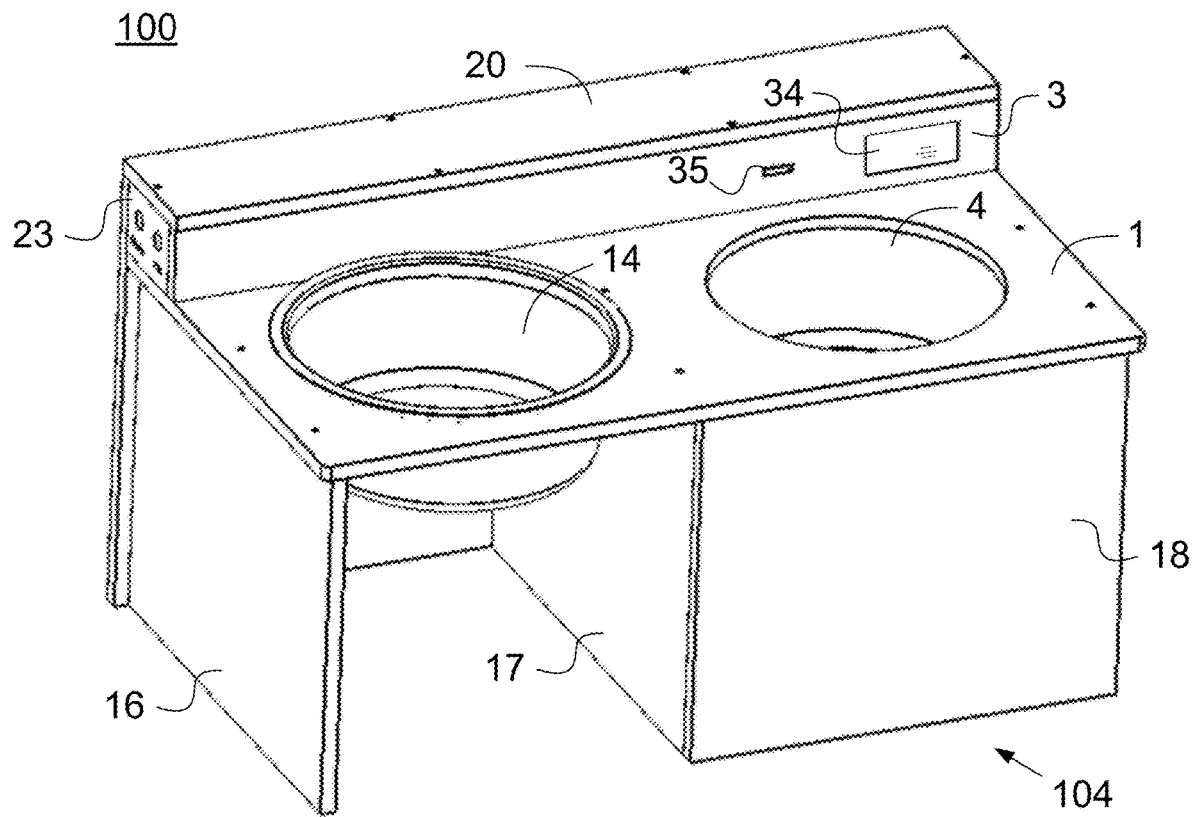
FIG. 1 is a perspective view of an automatic self-cleaning and self-filling water bowl apparatus in accordance with one or more aspects and features of the present invention.

As a preliminary matter, it will readily be understood by one having ordinary skill in the relevant art ("Ordinary Artisan") that the present invention has broad utility and application. As should be understood, any embodiment may incorporate only one or a plurality of the above-disclosed aspects of the invention and may further incorporate only one or a plurality of the above-disclosed features. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended nor is to be construed to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. 112, paragraph 6 or subsection (f), no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

The automatic self-cleaning and self-filling water bowl apparatus 100 in accordance with one or more aspects and features of the present invention generally comprises a sink 4; a fluid transport system 102, which sometimes may be referred to herein as plumbing; a housing 104 supporting the sink 4 at an elevated position and containing the fluid transport system 102; and a control assembly 106 for controlling the automatic self-cleaning and self-filling operations.

Figure 2:
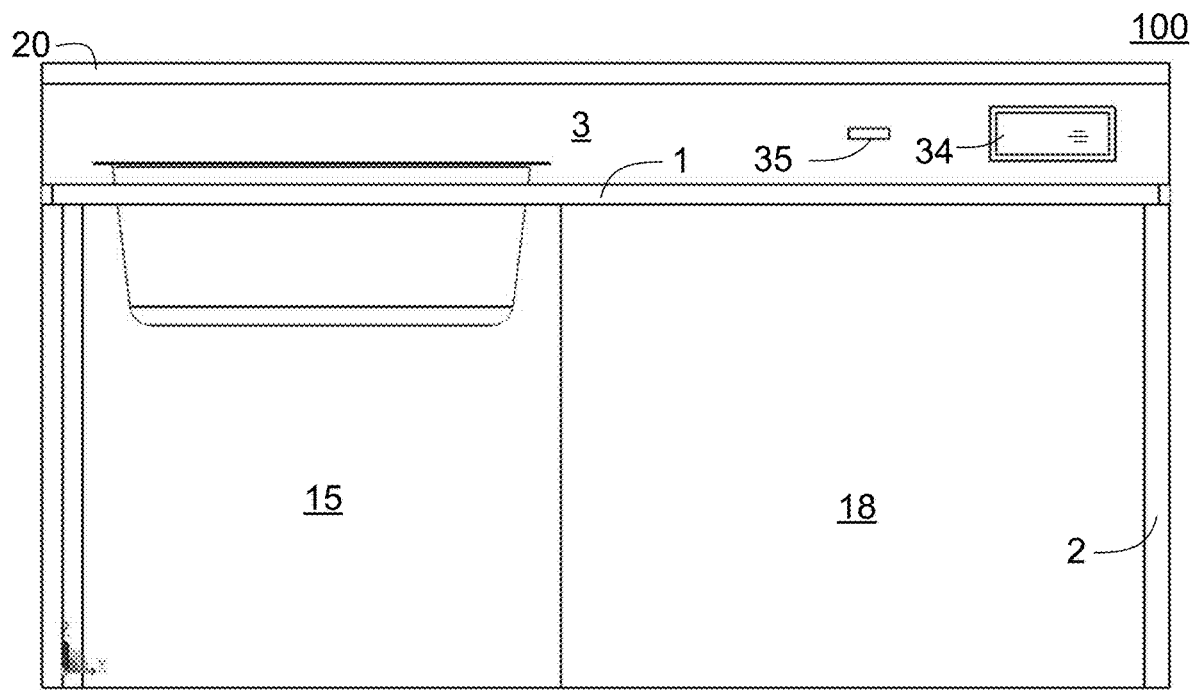
FIG. 2 is a front elevational view of the apparatus of FIG. 1.
Figure 3:
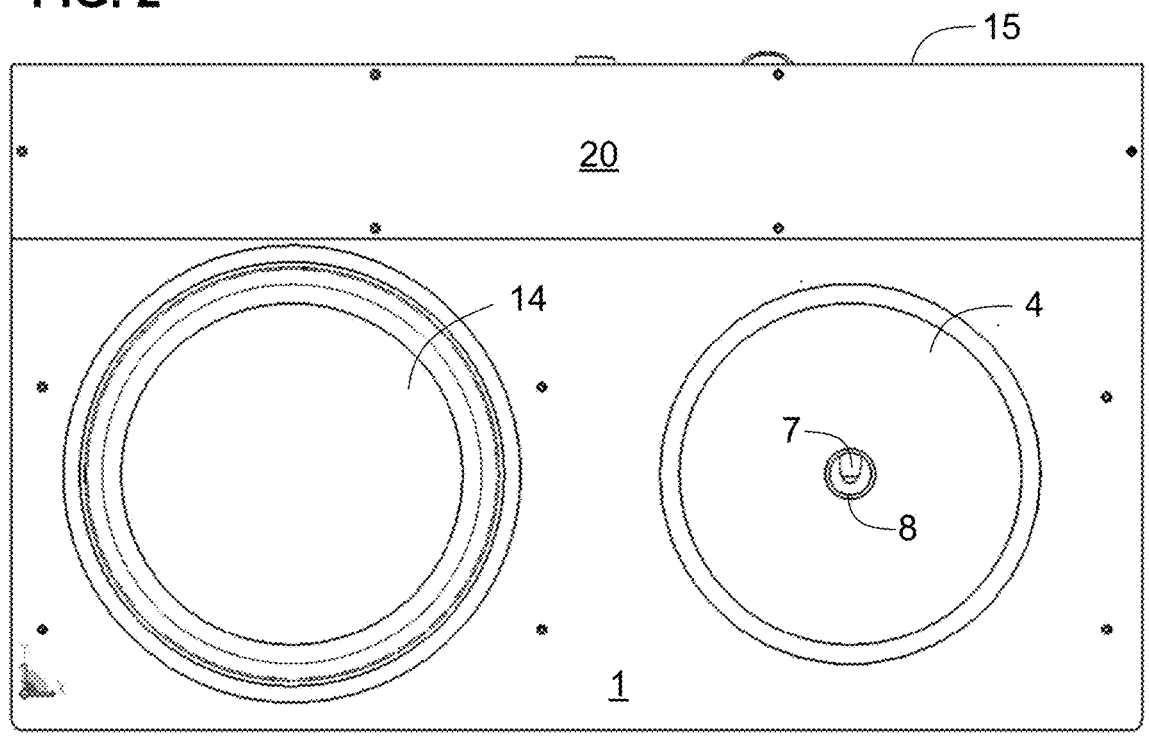
FIG. 3 is a top plan view of the apparatus of FIG. 1.
Figure 4:
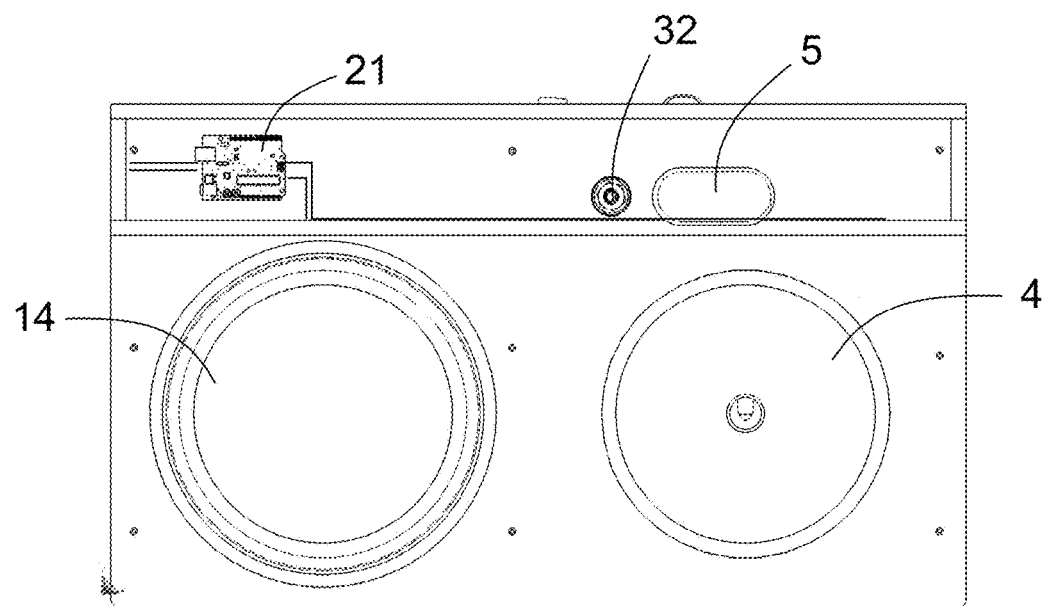
FIG. 4 is view similar to that of FIG. 3, wherein a top cover panel 20 is removed.
Figure 5:
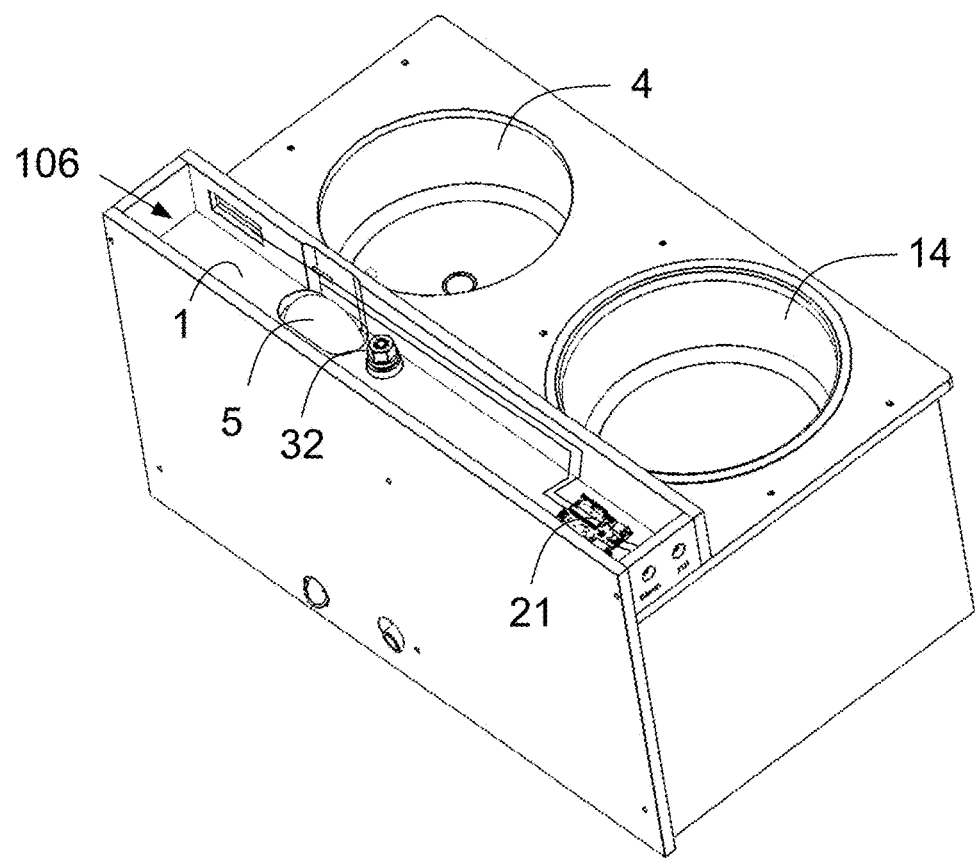
FIG. 5 is perspective view of the apparatus of FIG. 1 wherein the top cover panel 20 is removed.
Figure 6:
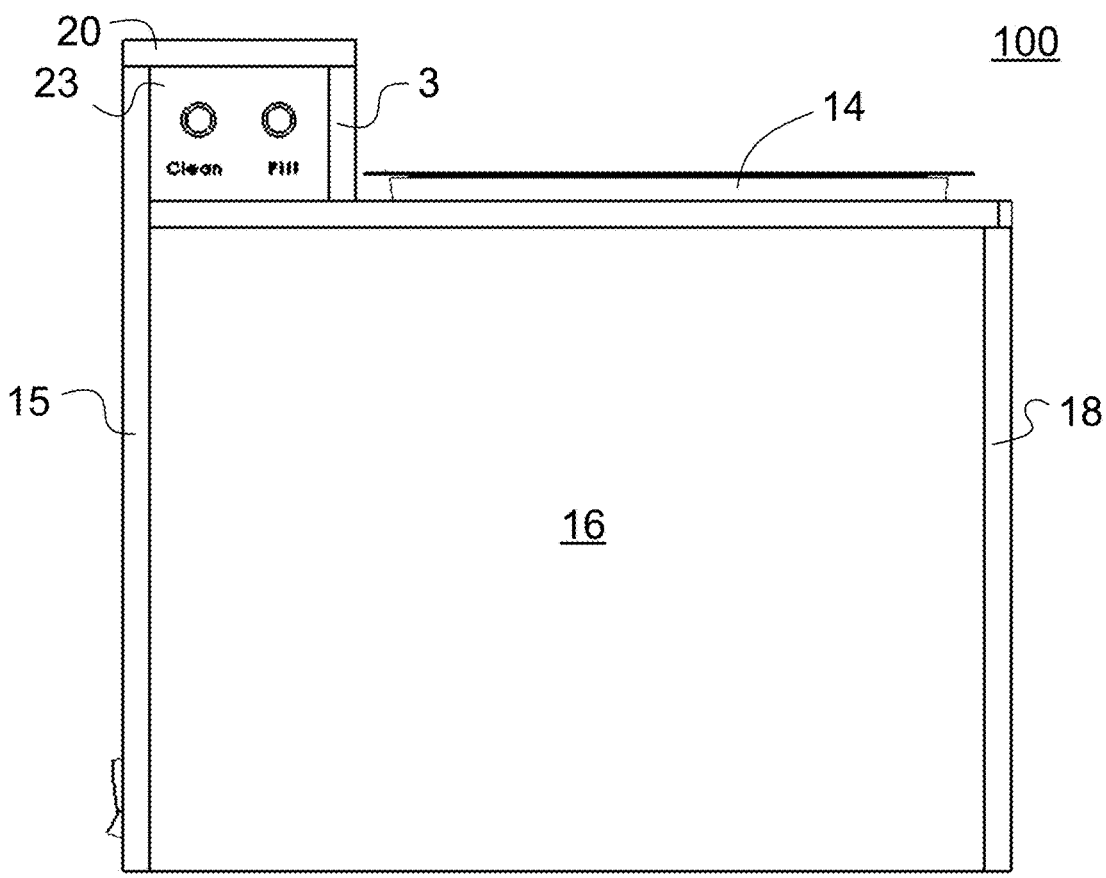
FIG. 6 is side elevational view of a first side of the apparatus of FIG. 1.
Figure 7:
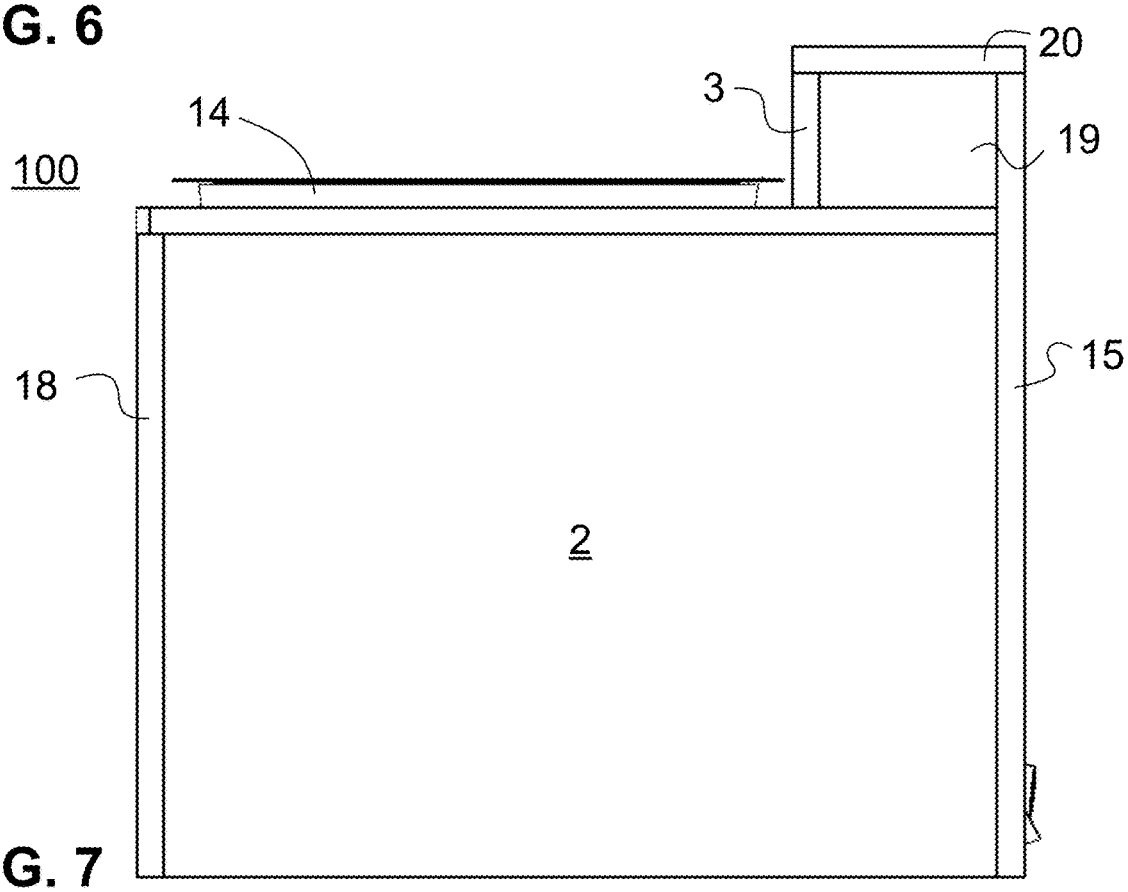
FIG. 7 is a side elevational view of a second side of the apparatus of FIG. 1 that is opposite to the side of FIG. 6.
Figure 8:
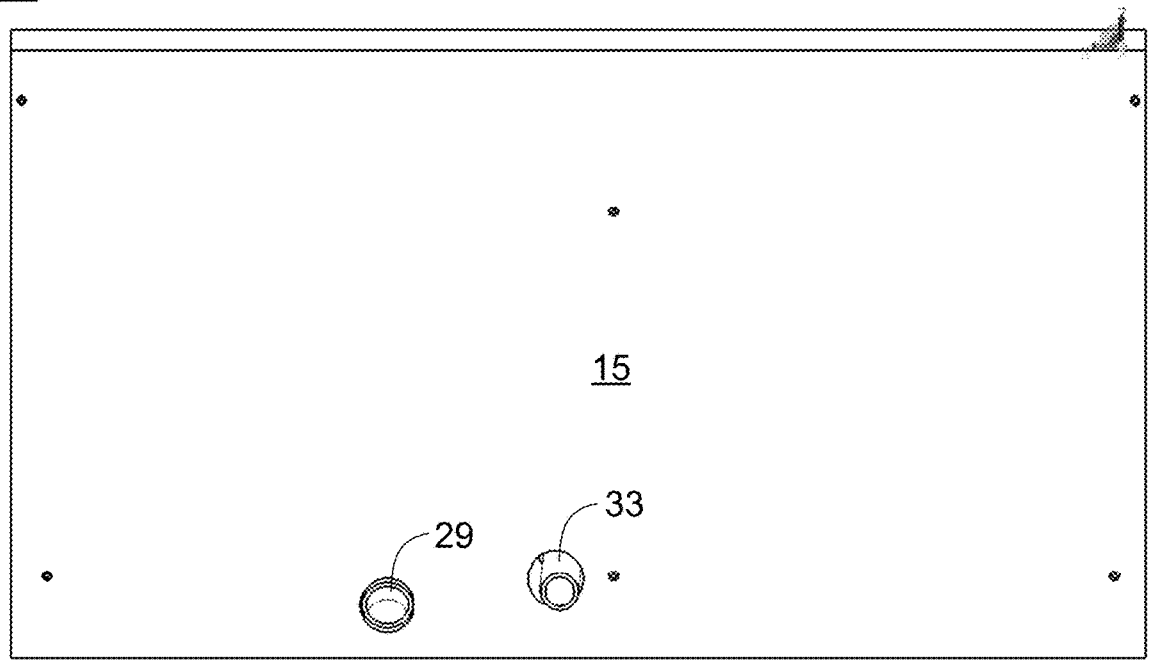
FIG. 8 is a rear elevational view of the apparatus of FIG. 1.
Figure 9:
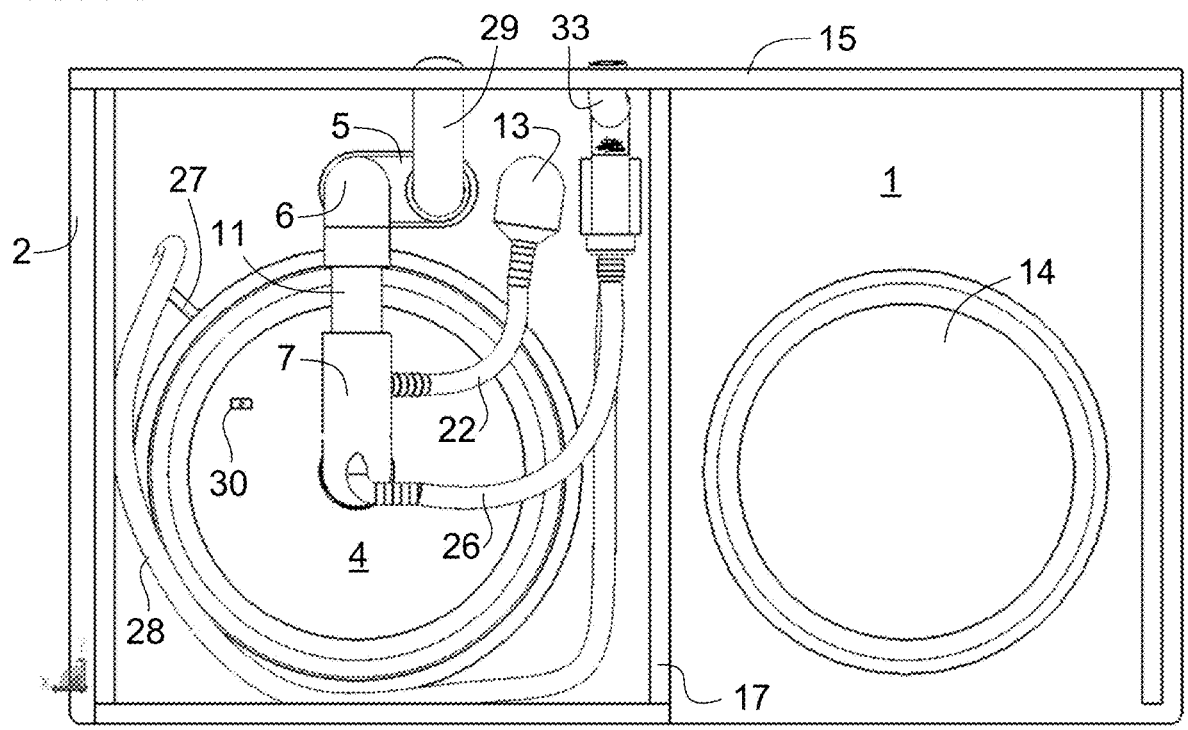
FIG. 9 is a bottom plan view of the apparatus of FIG. 1.
Figure 10:
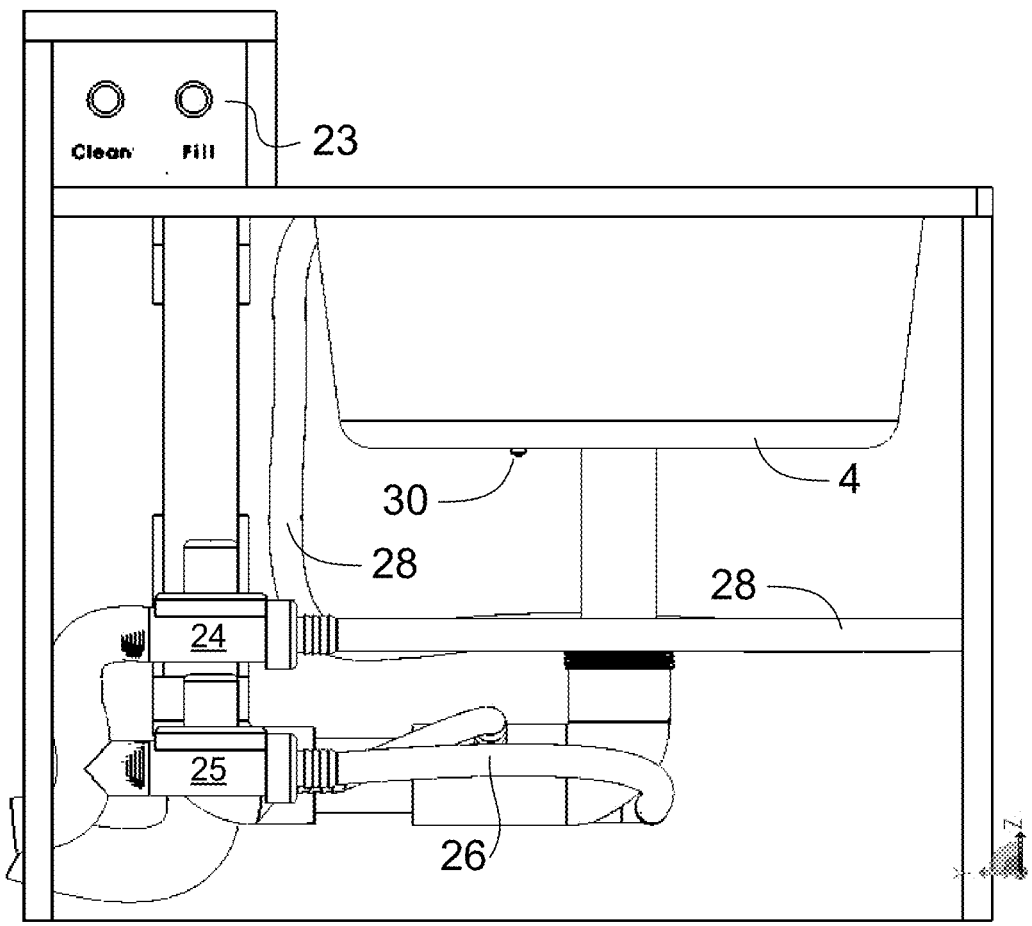
FIG. 10 is a side elevational view of the first side of the apparatus of FIG. 1, wherein certain components are omitted for a view of the inside of the apparatus.
Figure 11:
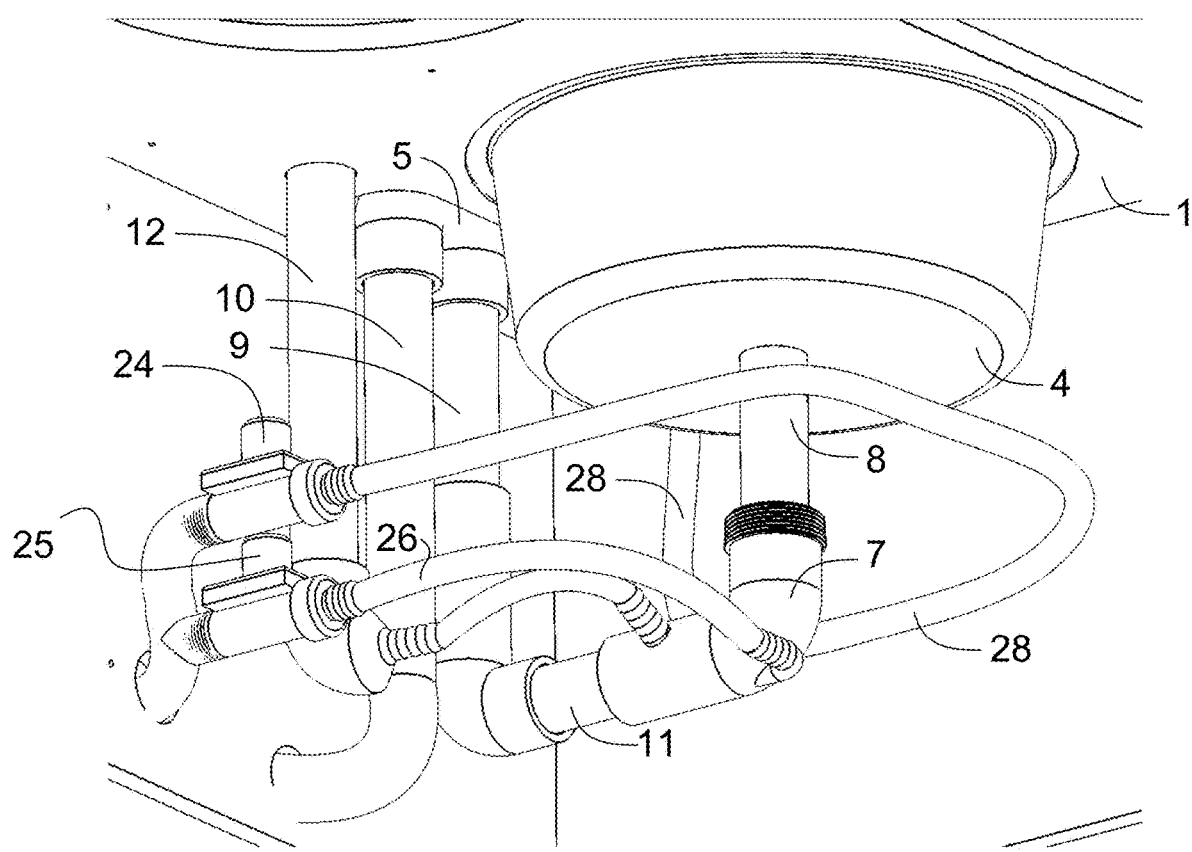
FIG. 11 is a partial, perspective view of the apparatus of FIG. 10 with certain components omitted for a view of the inside of the apparatus.

With reference to the drawings, FIG. 1 is a perspective view of an automatic self-cleaning and self-filling water bowl apparatus 100. Additionally, FIG. 2 is a front elevational view of the apparatus 100 of FIG. 1; FIG. 3 is a top plan view of the apparatus 100 of FIG. 1; FIG. 4 is view similar to that of FIG. 3, wherein a top cover panel 20 has been removed; FIG. 5 is perspective view of the apparatus 100 of FIG. 1 wherein the top cover panel 20 has been removed; FIG. 6 is side elevational view of a first side of the apparatus 100 of FIG. 1; FIG. 7 is a side elevational view of a second side of the apparatus 100 of FIG. 1 that is opposite to the side of FIG. 6; FIG. 8 is a rear elevational view of the apparatus 100 of FIG. 1; FIG. 9 is a bottom plan view of the apparatus 100 of FIG. 1; FIG. 10 is a side elevational view of the first side of the apparatus 100 of FIG. 1, wherein certain components are omitted for providing a view of the inside of the apparatus 100; FIG. 11 is a partial, perspective view of the apparatus 100 of FIG. 10 with certain components omitted for providing a view of the inside of the apparatus 100; and FIG. 12 is the same view of FIG. 11, with the sink 4 further being omitted.

Figure 13:
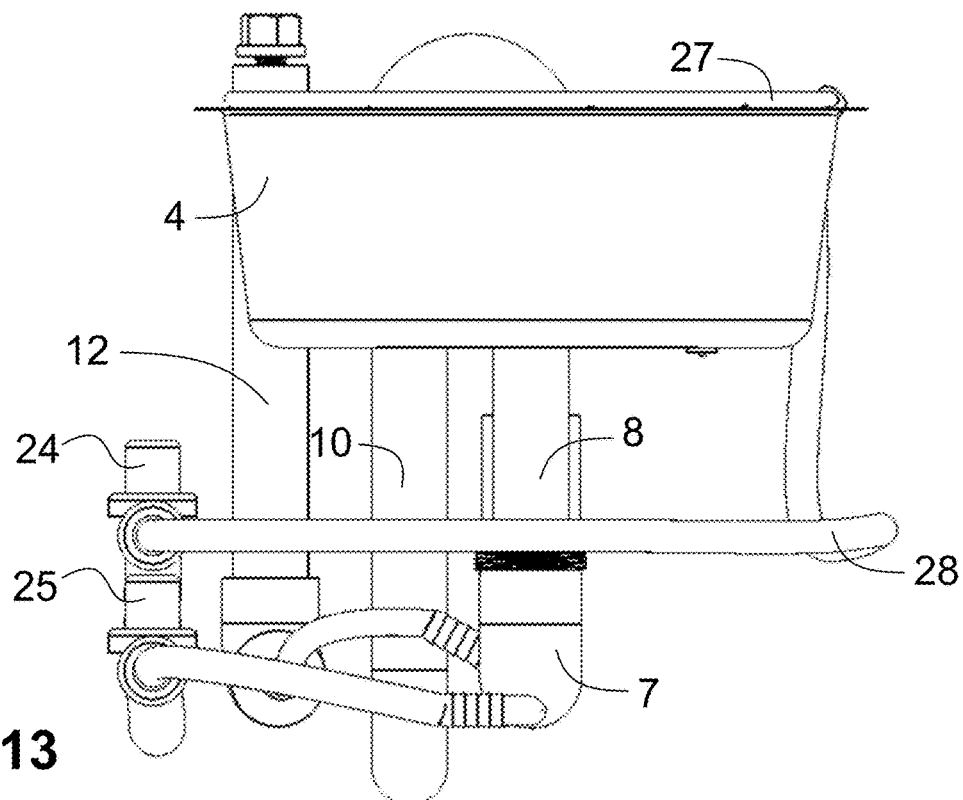
FIG. 13 is a front elevational view of the fluid transport subsystem of the apparatus of FIG. 1.
Figure 14:
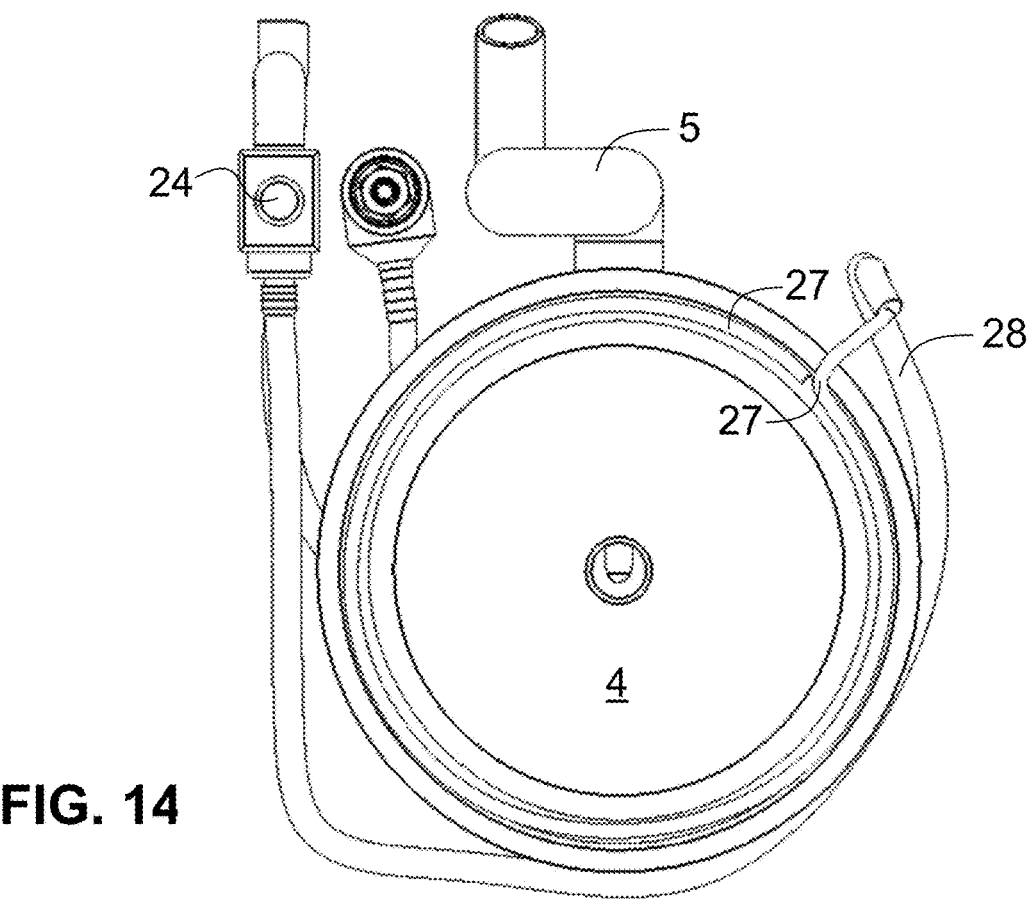
FIG. 14 is a top plan view of the subsystem of FIG. 13.
Figure 15:
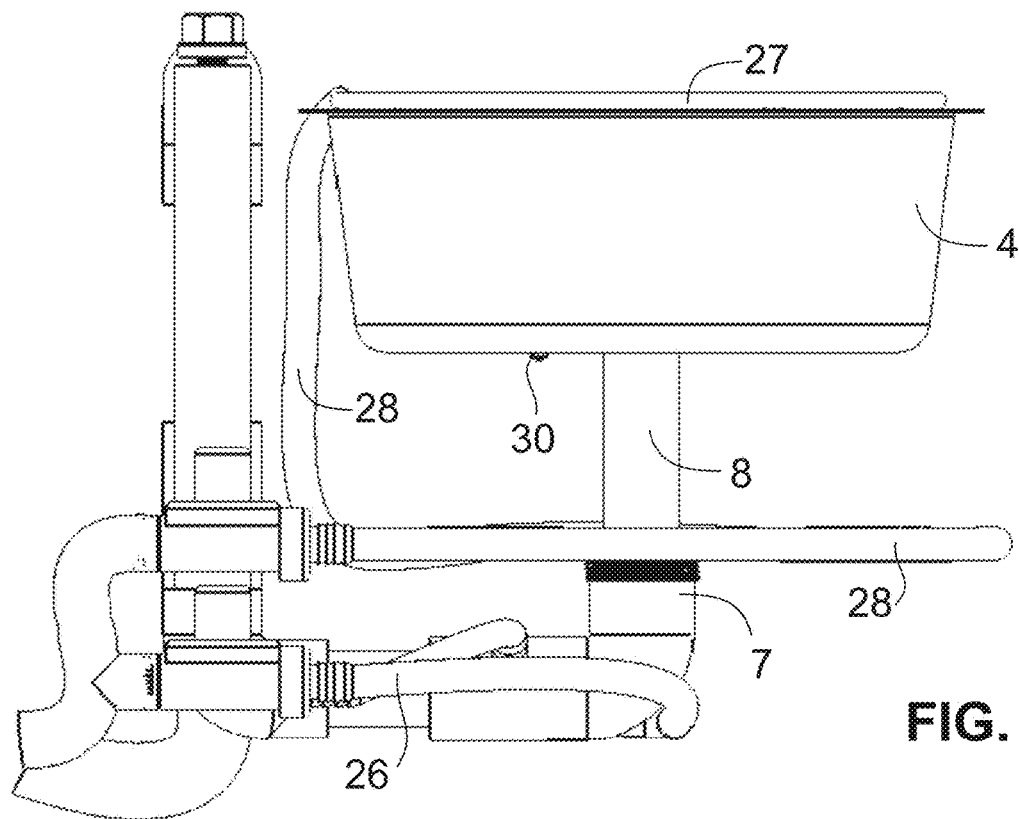
FIG. 15 is left elevational side view of the subsystem of FIG. 13.
Figure 16:
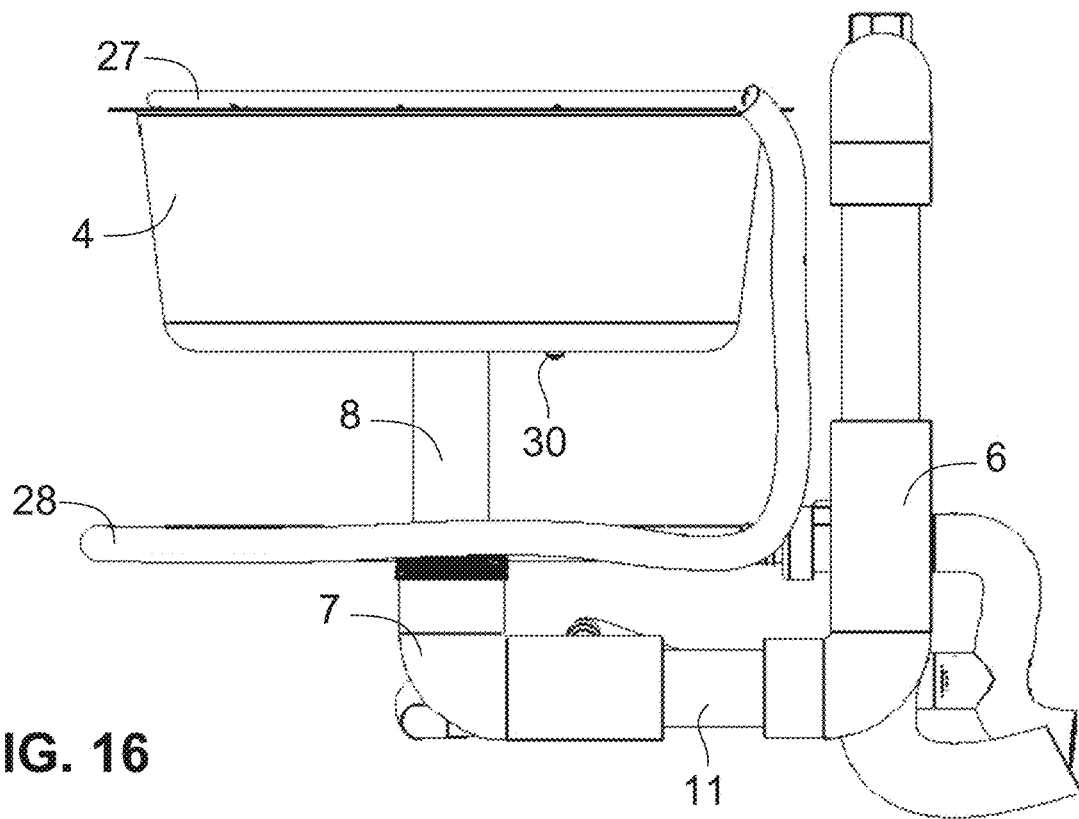
FIG. 16 is a right elevational side view of the subsystem of FIG. 13.
Figure 17:
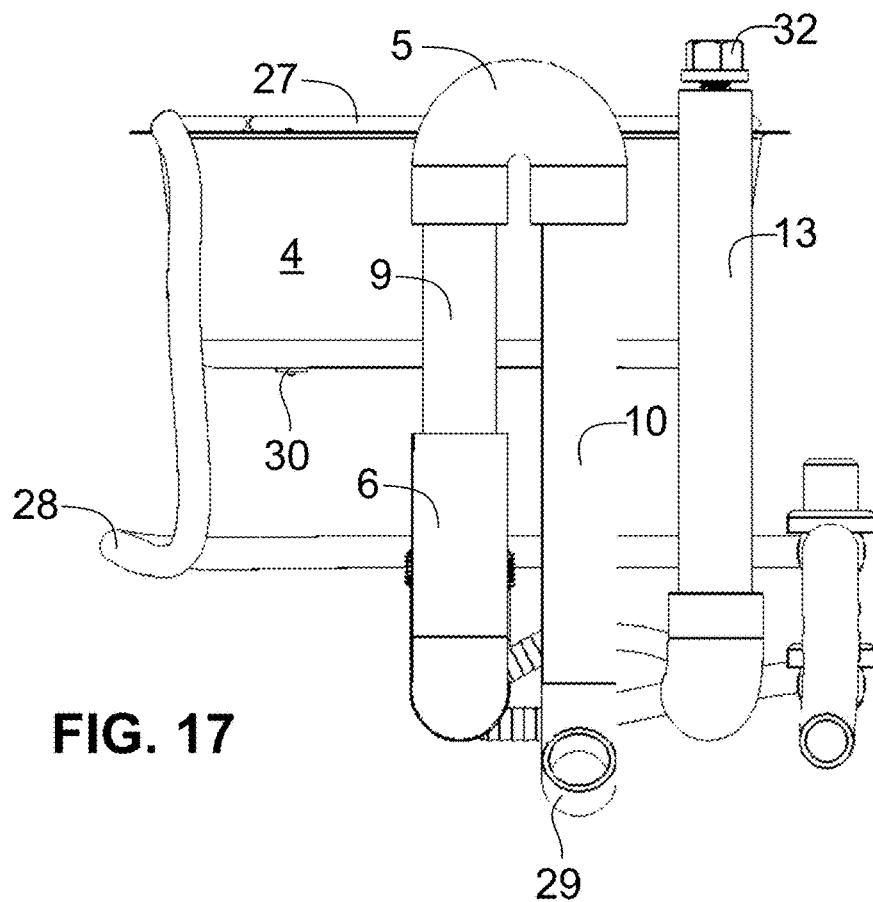
FIG. 17 is a rear elevational view of the subsystem of FIG. 13.
Figure 18:
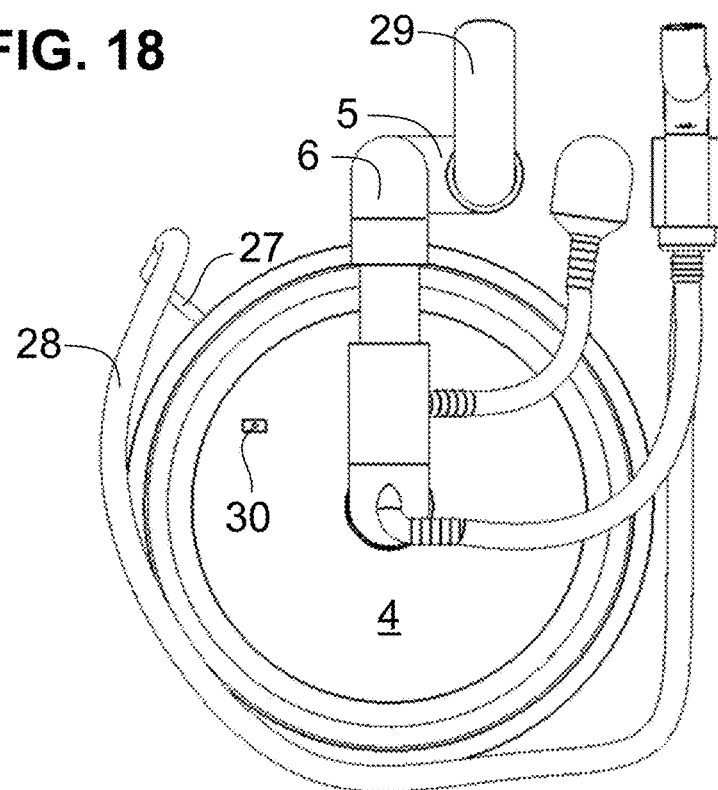
FIG. 18 is a bottom plan view of the subsystem of FIG. 13.
Figure 19:
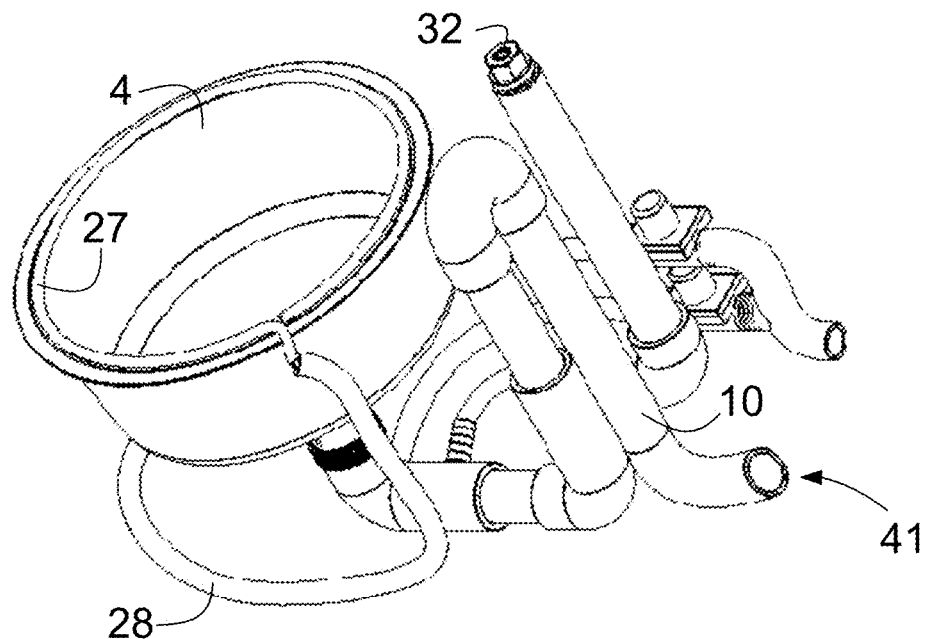
FIG. 19 is a perspective view of the subsystem of FIG. 13.
Figure 20:
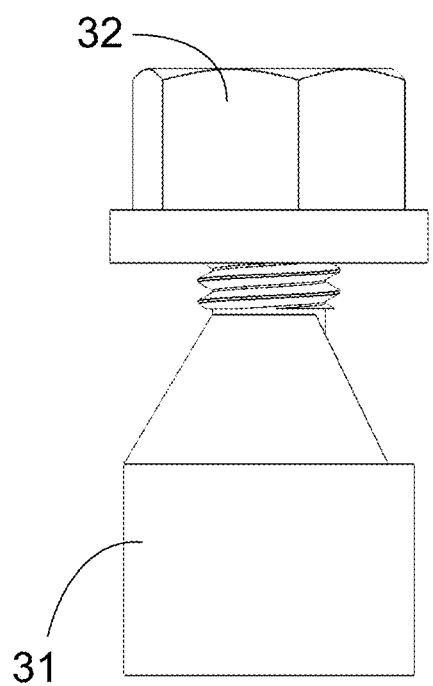
FIG. 20 is a side elevational view of a float switch housing and nut subassembly of the apparatus of FIG. 1.
Figure 21:
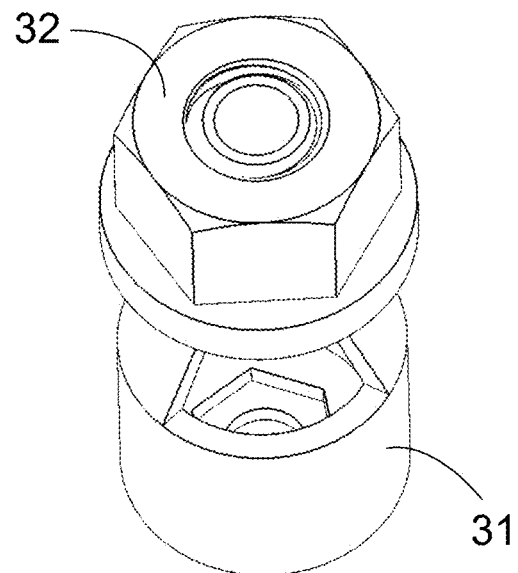
FIG. 21 is a perspective view of the float switch housing and nut subassembly of FIG. 20.

Additionally, FIG. 13 is a front elevational view of the fluid transport subsystem 150; FIG. 14 is a top plan view of the subsystem 150; FIG. 15 is left elevational side view of the subsystem 150; FIG. 16 is a right elevational side view of the subsystem 150; FIG. 17 is a rear elevational view of the subsystem 150; FIG. 18 is a bottom plan view of the subsystem 150; FIG. 19 is a perspective view of the subsystem 150; FIG. 20 is a side elevational view of a float switch housing and nut subassembly of the apparatus 100 of FIG. 1; and FIG. 21 is a perspective view of the float switch housing and nut subassembly of FIG. 20.

The apparatus 100 preferably serves as an outdoor water feeding system for a pet, and the sink 4 preferably has a fluid holding capacity comparable to conventional water bowls for dogs. In this respect, conventional water bowls generally range in size from a pint to eleven quarts corresponding to the size and number of dogs that will use the water bowl.

Figure 12:
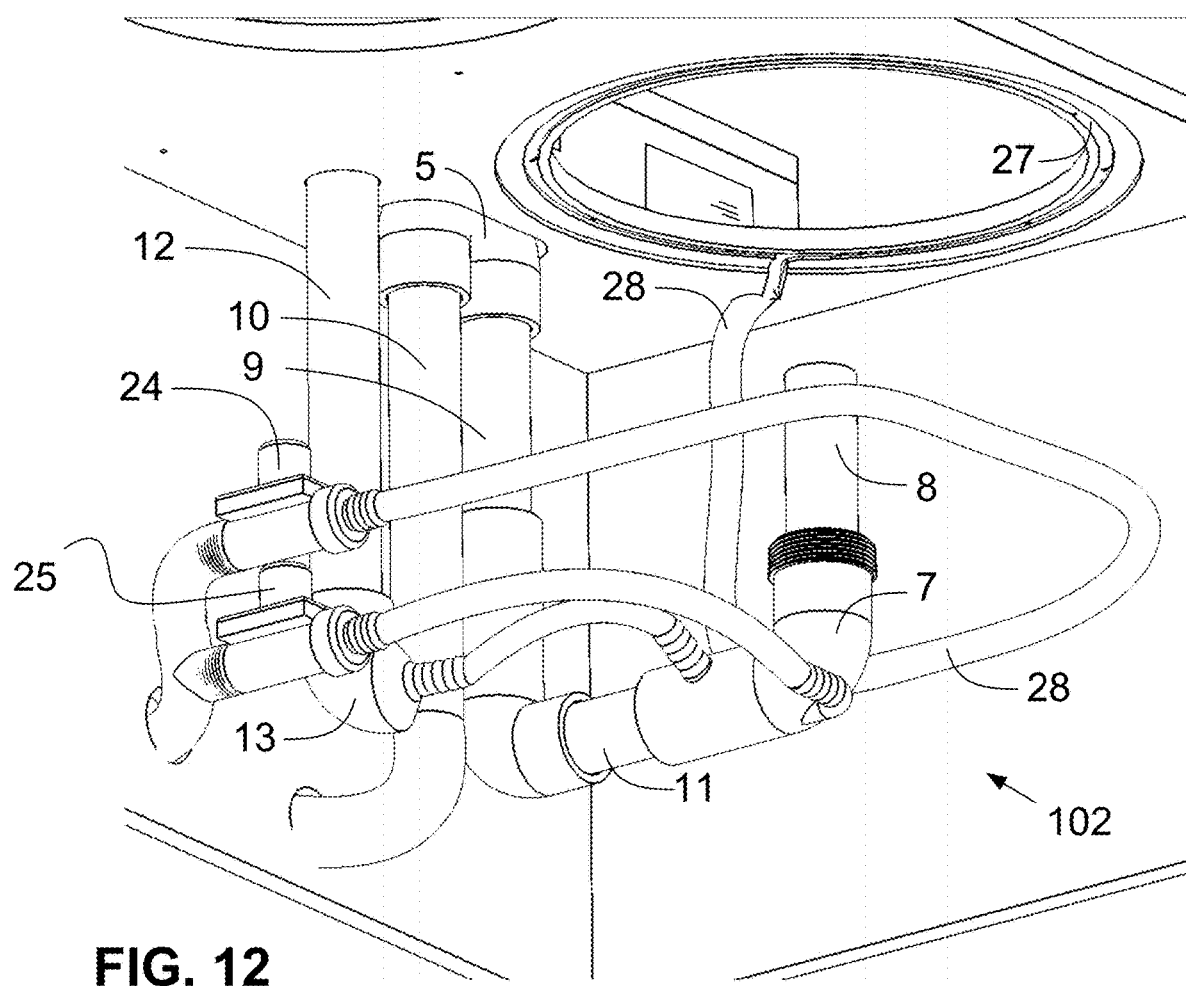
FIG. 12 is the same view of FIG. 11, with the sink further being omitted.

The fluid transport system 102 is perhaps best shown in FIG. 12 and comprises a fluid inflow subsystem and a fluid outflow subsystem. The fluid inflow subsystem delivers water to a sink 4, which serves as a water bowl; the fluid outflow subsystem delivers water from the sink 4. In this respect, the fluid inflow subsystem delivers water to a sink 4 preferably from an exterior of the housing 104, and the fluid outflow subsystem delivers water from the sink 4 preferably to an exterior of the housing 104.

The fluid inflow subsystem comprises a passageway, preferably defined by connected PVC piping and tubing, including: a supply line 33, a distal end of which protrudes external to the housing 104 and includes a connector for connecting to a water hose (not shown); a fill hose 38; and a spray ring 27.

The fluid outflow subsystem comprises a passageway, preferably defined by connected PVC piping and tubing, including: a main drain pipe 8; a threaded pipe 7; a bottom pipe 11; a PVC pipe 6; a vertical flush pipe 9; a U-shaped PVC pipe 5; a vertical drain pipe 10; and a drainpipe 29, a distal end of which protrudes external to the housing 104 and may include a connector for connecting to a water hose preferably for transport to a sewer drain or, alternatively, drainage to a yard, garden, or shrubbery (not shown). Furthermore, the fluid outflow system begins at an elevation below the bottom of the sink 4, and preferably the elevation of the top of the main drain pipe 8, ascends to an elevation as high as the desired level of water to be held in the sink 4, and then descends to an elevation at least to—and preferably below—the elevation of the bottom of the sink 4. In the illustrated embodiment, the fluid outflow subsystem descends generally to the elevation of the drainage pipe 29.

The housing 104 supports the sink 4 at an elevated position and contains the fluid transport system 102. As shown, the housing 104 preferably comprises: a top cover or countertop 1 supported by side support panel 2 at one end; side support panel 16 at an opposite end; and back panel 15 extending therebetween and defining a backside of the apparatus 100. The housing 104 further comprises an inside panel 17 aligned in parallel with the end panels 2,16 and supporting an intermediate portion of the countertop 1. The housing 104 also comprises a front panel 18 that extends between the inside panel 17 and side panel 2 by which, together with the back panel 15, define an enclosed plumbing space is provided in which the fluid transport system 102 is contained.

The housing 104 further comprises a control front panel, top side cap 19 at one end thereof, top side cap 23 at an opposite end thereof; and top cover panel 20 which, together with the back panel 15, define an enclosed controller space in which components of the control assembly 106 is contained. As will be appreciated, other components of the control assembly 106 are contained within the housing with the fluid transport system, described in detail herein.

In this regard, the control assembly 106 as illustrated preferably comprises a controller, such as control circuitry illustrated as a customizable circuit board commercially available from Arduino SA at the url arduino.cc, and a proximity sensor 35, both contained within the controller space. The control assembly 106 further comprises: a water level detector, represented by a float switch (not shown) contained in a float switch holder 33 secured with a float switch nut 32 at the top end of water level pipe 12, and a hose 22 for water level detection, extending from the bottom end of the water level pipe 12—and specifically an end cap 13 with port—to the threaded pipe 7; a solenoid valve 24 extending between and controlling flow between supply line 33 and fill hose 24; and a solenoid valve 25 and clearing hose 26 defining a fluid passageway from the supply line 33 to the threaded pipe 7 bypassing the sink 4. These additional components are contained within the plumbing space. Wires extend between and connect the control circuitry 21 with the other electronic components of the control assembly 106, some wires of which are not shown in the drawings for clarity. Furthermore, the apparatus 100 preferably is powered with a conventional power supply that plugs into a conventional outlet, which is not shown for clarity. In alternatives, the apparatus is powered by one or more batteries; powered by solar power; or both.

Optionally, the apparatus 100 further supports at an elevated position a removable food bowl 14 that is received within an opening of the countertop 1, as illustrated in the drawings; the control assembly 106 of apparatus 100 further comprises a temperature sensor 30 configured to detect the temperature of water in the sink 4, whereby the temperature can be monitored by the controller; and the control assembly 106 further comprises an display screen 34 for displaying information, including for example, water temperature, number of flushes and fills, status of operations, and any other desired operational data of the apparatus. The information is displayed preferably from data that is monitored and stored in transitory or non-transitory computer-readable medium of the controller, as desired. Moreover, in implementations using solar and/or batteries, a battery level may be displayed.

The control assembly 106 controls operations of the apparatus 100. In operation, the control assembly 106 detects when an animal is proximate the housing 102 in front of the sink 4 via the proximity sensor 35. When the animal leaves such proximity, the control assembly initiates a flush and fill cycle during which the sink 4 is flushed and filled. The cycle may be performed each time an animal is detected to have left such proximity.

Alternatively, a count of the number of times an animal has been detected to have left such proximity can be kept, with a flush and fill cycle being carried out after a predetermined threshold is reached. In this respect, a cycle may be performed every third time that an animal has been detected to have left such proximity. In any event, the trigger point is set so as to present clean water for an animal to drink. Preferably, the trigger point is adjustable, and is set by a user at the time of implementation of the apparatus 100. Alternatively, the trigger point can be preset as part of the manufacture of the apparatus 100. In at least one embodiment, the display 34 comprises a touch screen display operatively connected to the controller, by which user input component the threshold number can be set or adjusted by a user any time during use of the apparatus 100. The control assembly further optionally may include a chronometric apparatus for keeping time, and a flush and fill cycle may be performed at one or more predetermined times of day and/or days of the week, as predetermined or set by the user.

Optionally, and the controller is configured to initiate a flush and fill cycle upon the temperature reaching a predetermined threshold, when a temperature sensor is included in the control assembly. The predetermined threshold could be set so as to avoid freezing of the fluid in the sink; could be set so as to maintain cooler fluid in the sink than ambient temperature; or both. Moreover, a heating element may be provided in some embodiments, which heating element is operatively connected to and activated by the controller for heating of the fluid in the sink in order to prevent freezing.

In a preferred method of performing a flush and fill cycle, solenoid valve 24 is opened to permit fluid flow therethrough from the supply line 33 to the fill hose 28. The fluid travels through the fill hose 28 into the spray ring 27. The spray ring 27 includes a number of spaced openings. Due to fluid pressure, the fluid exits each opening in the form of a spray jet. Each opening preferably is formed such that the spray jet exiting the opening is directed to a portion of the side wall of the sink 4 (this is shown, for example, in FIG. 24, described below). It will be appreciated that when the fluid is being flushed from the sink, the spray jet serves to rinse a portion of the side wall of sink.

In the preferred method of performing a flush and fill cycle, solenoid valve 25 also is opened to permit fluid flow therethrough from the supply line 33 to the fill hose 28. The fluid travels through the fill hose 28 into a port of the threaded pipe 7. Fluid pressure causes the fluid to flow into and through the threaded pipe 7 toward the fluid exit 41 of drainpipe 29, traveling through the bottom pipe 11; PVC pipe 6; a vertical flush pipe 9; a U-shaped PVC pipe 5; a vertical drain pipe 10; and a drainpipe 29, a distal end of which protrudes external to the housing 104 and preferably includes a connector for connecting to a water hose for drainage to a yard, garden, or shrubbery. It will be appreciated that the opening the solenoid valve 25 results in active flushing of the fluid in the sink 4.

In the preferred method, the solenoid valve 25 is opened first, while keeping the solenoid valve 24 closed, which results in flushing of the sink 4. After about three seconds, the solenoid valve 24 is opened for about two seconds while the solenoid valve 25 is kept closed, resulting in rinsing of the sink 4 with maximum system fluid pressure. Thereafter, the solenoid valve 25 is again opened for about two seconds and the solenoid valve 25 is closed for additional flushing of the sink 4. The solenoid valve 24 is again opened and the solenoid valve 25 is closed for filling of the sink 4. The solenoid valve 24 is kept open until the float switch detects that the water level in the sink 4 has reached the desired water level for presenting water to an animal for drinking.

The control assembly 104 can be configured for alternatives sequences and durations of operation of the solenoid valves 24,25, as will be appreciated to the Ordinary Artisan. For example, the solenoid valve 25 first could be opened for about four seconds to flush the sink 4, and then the solenoid valve 24 could be opened to fill the sink 4. Furthermore, the solenoid valve 24 could be opened concurrently with the solenoid valve 25 for simultaneous rinsing and flushing of the sink 4.

With reference now to FIGS. 22 through 30 of U.S. patent application publication no. 2015/0107522, which '522 publication is incorporated herein by reference, each of these figures shows a photograph of components of a working prototype of an automatic self-cleaning and self-filling pet water bowl apparatus and system performing methods in accordance with one or more aspects and features of the present invention. In particular, FIG. 22 of the '522 publication is a perspective view of the prototype positioned for use near shrubbery on a back patio. FIG. 23 of the '522 publication is another view of the prototype as shown in FIG. 22 of the '522 publication.

FIG. 24 of the '522 publication is a view of the prototype during rinsing of the sink; jets of water being sprayed from the spray ring circling the top of the sink can be seen. The water jets are directed against the length of the walls of the sink. The top cover panel is also removed to show the components of the control assembly contained therein. The water hose is also shown coupled to the supply line, and an electrical power cord can be seen, which supplies power to the prototype.

FIG. 25 of the '522 publication is another view of components of the prototype, wherein the back panel has been removed. The components of the control assembly within the controller space are perhaps been seen in FIG. 25 of the '522 publication, including the wires connecting the electric components. The electric power supply of the prototype also is perhaps best seen in FIG. 25 of the '522 publication, the power supply box being located on the inside of the side panel that bounds part of the plumbing space. FIG. 26 of the '522 publication and FIG. 27 of the '522 publication are similar views to that of FIG. 25.

FIG. 28 of the '522 publication focuses on the fluid transport system within the plumbing space, and FIG. 29 of the '522 publication is a similar view to that of FIG. 28 of the '522 publication. The two solenoid valves of the control assembly are perhaps best seen in this view.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

LEGEND

The following components are called out in the drawings with the following callout numbers.
1 Countertop
2 Side support panel
3 Control front panel
4 Sink
5 U-shaped PVC pipe
6 PVC pipe
7 Threaded pipe
8 Main drain pipe
9 Vertical flush pipe
10 Vertical drain pipe
11 Bottom pipe
12 Water level pipe
13 Water level end cap with port
14 Food bowl
15 Back panel large
16 Side support panel
17 Inside panel
18 Front panel
19 Top side cap
20 top cover panel
21 controller (Arduino board)
22 Hose for water level detection
23 Top side cap
24 Solenoid valve
25 Solenoid valve
26 Clearing hose
27 Spray ring
28 Fill hose
29 Drainpipe
30 Temperature sensor
31 Float switch holder
32 Nut for float switch holder
33 Supply line
34 Display
35 Proximity sensor
41 Fluid exit
100 Apparatus 102 Fluid transport system
104 Housing
106 Control assembly

What is claimed is:

1. An automatic self-cleaning and self-filling animal bowl apparatus, comprising a sink; a fluid transport system comprising a fluid inflow subsystem for transporting water to the sink, and a fluid outflow subsystem for transporting fluid from the sink; a housing supporting the sink and containing the fluid transport system; and a control assembly configured to control the automatic self-cleaning and self-filling operations of the apparatus; wherein the control assembly comprises a controller, a fluid level detector for detecting a fluid level in the sink, and a valve control mechanism; and wherein the control assembly further comprises a second valve control mechanism that controls the flow of fluid from the fluid inflow subsystem, through a bypass of the sink, to the fluid outflow subsystem.

2. The apparatus of claim 1, wherein the fluid inflow subsystem transports water from an exterior of the housing to the sink; and wherein the fluid outflow subsystem transports water from the sink to an exterior of the housing.

3. The apparatus of claim 1, wherein the fluid outflow system begins at an elevation below the bottom of the sink; ascends therealong to an elevation as high as the desired level of fluid to be held in the sink; and then descends therealong to an elevation at least to the elevation of the bottom of the sink.

4. The apparatus of claim 1, wherein the valve control mechanism comprises a solenoid valve that controls the flow of fluid through the fluid inflow subsystem to the sink.

5. The apparatus of claim 1, wherein the fluid level detector comprises a float switch for detecting when the fluid level in the sink reaches a predetermined level.

6. The apparatus of claim 5, wherein the fluid level detector is operatively connected to the controller; wherein detection that the fluid level in the sink has reached the predetermined level triggers a signal to the controller; and wherein the signal to the controller results in closing of the valve control mechanism.

7. The apparatus of claim 1, further comprising a power supply that plugs into an electrical outlet for powering of the apparatus.

8. The apparatus of claim 1, further comprising one or more batteries for powering of the apparatus.

9. The apparatus of claim 1, wherein the control assembly is solar powered.

10. The apparatus of claim 1, wherein the housing further supports a removable food bowl at an elevated position, which food bowl is received within an opening of the countertop of the housing.

11. The apparatus of claim 1, wherein the control assembly further comprises a temperature sensor operatively connected to a controller of the control assembly and configured to detect the temperature of fluid in the sink, wherein the temperature can be monitored by the controller and wherein the controller is configured to initiate a flush and fill cycle upon the temperature reaching a predetermined threshold.

12. The apparatus of claim 1, wherein the control assembly further comprises a display screen operatively connected to the controller for displaying information.

13. The apparatus of claim 12, further comprising non-transitory computer-readable medium in which the information displayed is stored, wherein the information comprises at least one of fluid temperature, number of flushes and fills, and status of operations.

14. An automatic self-cleaning and self-filling animal bowl apparatus, comprising a sink; a fluid transport system; a housing supporting the sink and containing the fluid transport system; and a control assembly configured to control the automatic self-cleaning and self-filling operations of the apparatus, the control assembly comprising a controller and a temperature sensor operatively connected to the controller and configured to detect the temperature of fluid in the sink, wherein the temperature is monitored by the controller and the controller is configured to initiate a flush and fill cycle upon the temperature reaching a predetermined threshold; wherein the control assembly further comprises a display screen operatively connected to the controller for displaying information and comprising non-transitory computer-readable medium in which the information displayed is stored, and wherein the information comprises at least one of fluid temperature, number of flushes and fills, and status of operations.

15. The apparatus of claim 14, wherein the housing further supports a removable food bowl at an elevated position, which food bowl is received within an opening of the countertop of the housing.

\* \* \* \* \*